United States Patent [19]

Kanamaru

[11] Patent Number: 4,736,355
[45] Date of Patent: Apr. 5, 1988

[54] DIGITAL AUDIO DATA REPRODUCTION APPARATUS

[75] Inventor: Hitoshi Kanamaru, Tokorozawa, Japan

[73] Assignee: Pioneer Electronic Corporation, Tokyo, Japan

[21] Appl. No.: 687,244

[22] Filed: Dec. 28, 1984

[30] Foreign Application Priority Data

Dec. 29, 1983 [JP] Japan .............................. 58-202879[U]

[51] Int. Cl.$^4$ ........................ G11B 27/36; H04N 5/94
[52] U.S. Cl. ........................................ 369/59; 369/48; 358/343
[58] Field of Search ...................... 369/1, 2, 59, 19, 20, 369/69, 48, 49; 360/32; 358/342, 335, 343

[56] References Cited

U.S. PATENT DOCUMENTS

| | | | |
|---|---|---|---|
| 4,393,489 | 7/1983 | Mehrotra | 358/342 |
| 4,433,347 | 2/1984 | Sugiyama et al. | 358/342 |
| 4,446,488 | 5/1984 | Suzuki | 358/342 |

Primary Examiner—Donald McElheny, Jr.
Attorney, Agent, or Firm—Schwartz, Jeffery, Schwaab, Mack, Blumenthal & Evans

[57] ABSTRACT

A digital audio data playback apparatus such as a digital audio disc player is configured such that a PCM encoder and associated circuits within the apparatus can be used both for playback of recording discs having only digital audio data recorded thereon and also for processing a digital audio signal output from a video disc player during playback of a video recording disc having digital audio data recorded thereon, superimposed upon frequency-modulated recorded audio and video data. This eliminates the need to provide a PCM encoder circuit within such a video recording disc player.

7 Claims, 8 Drawing Sheets

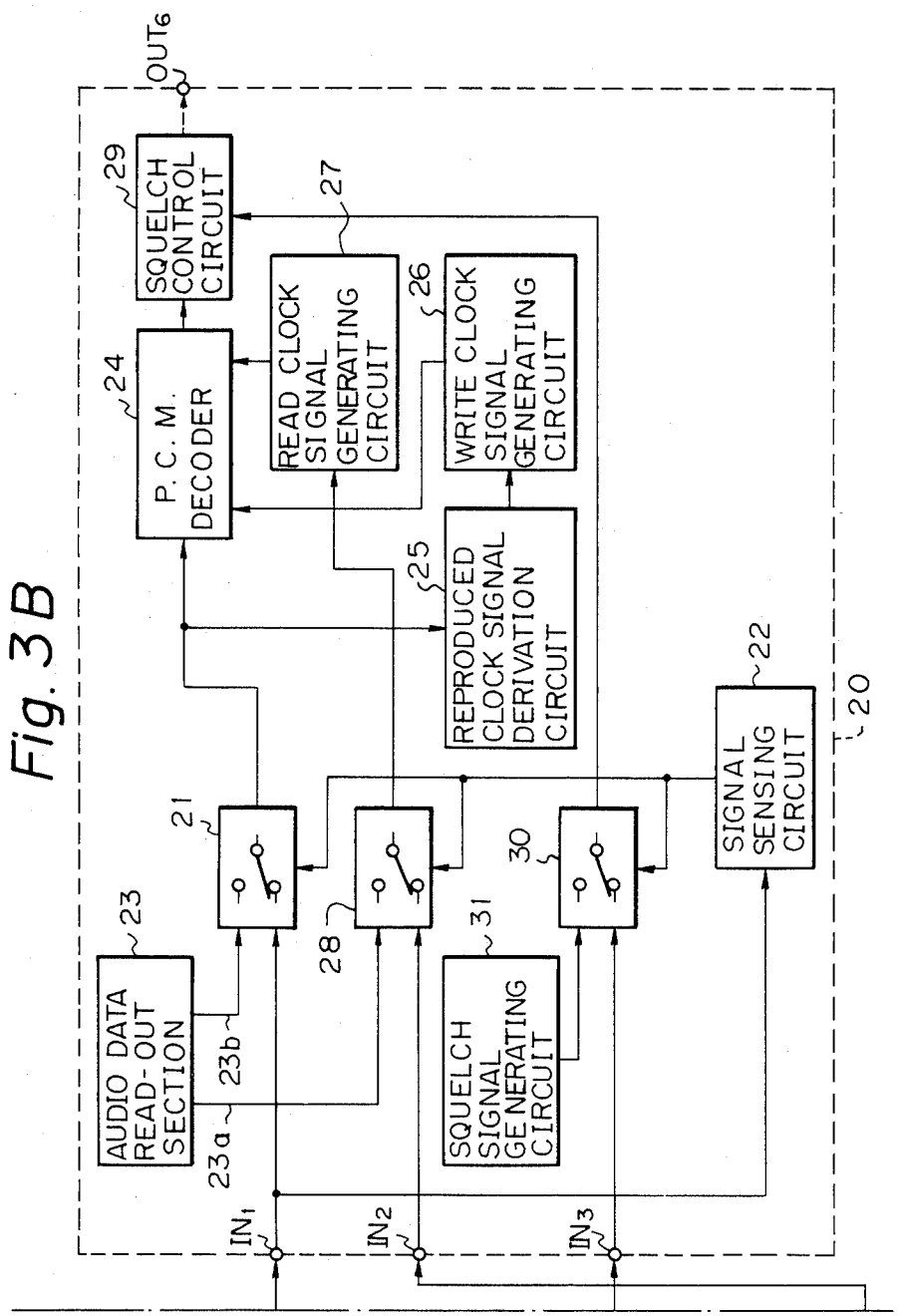

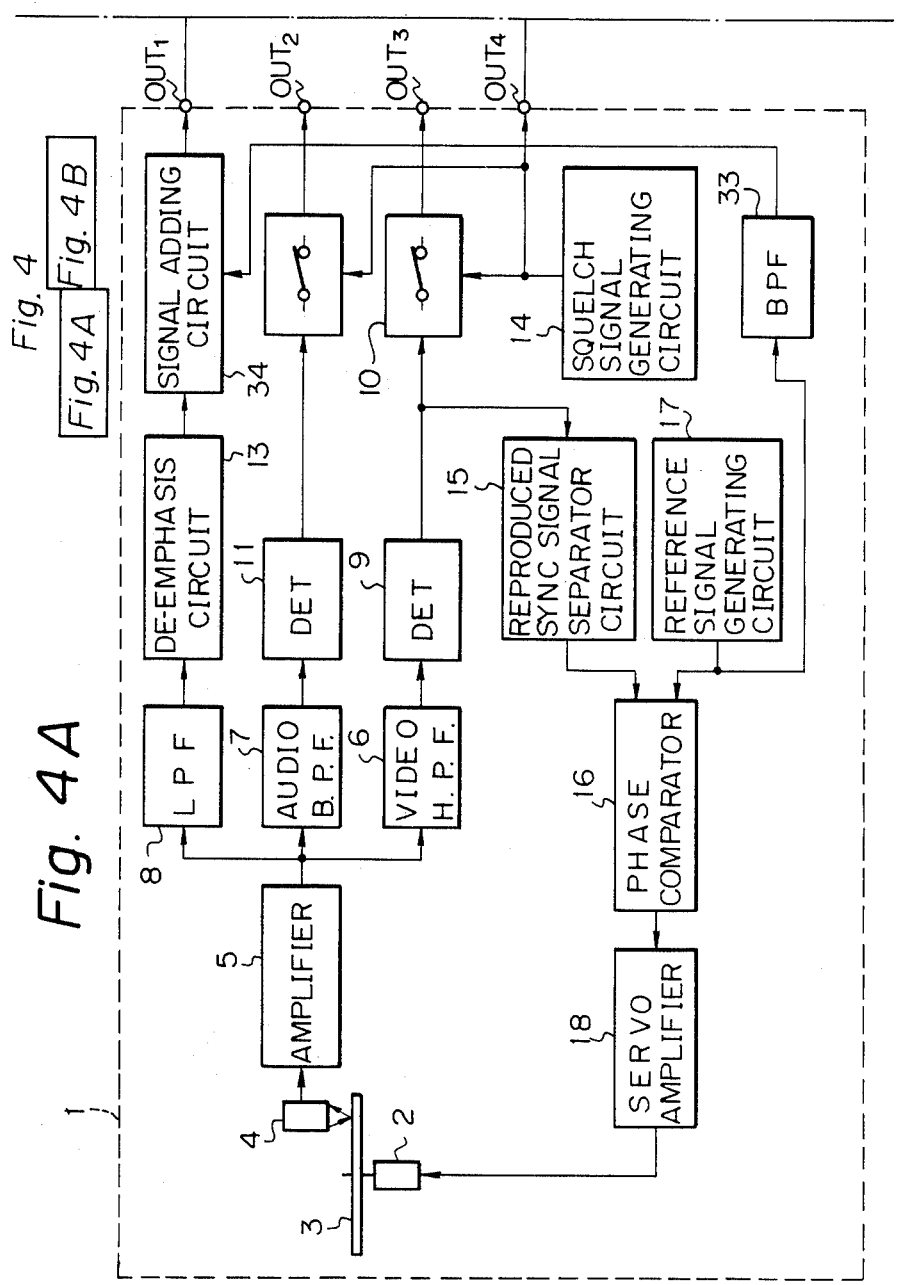

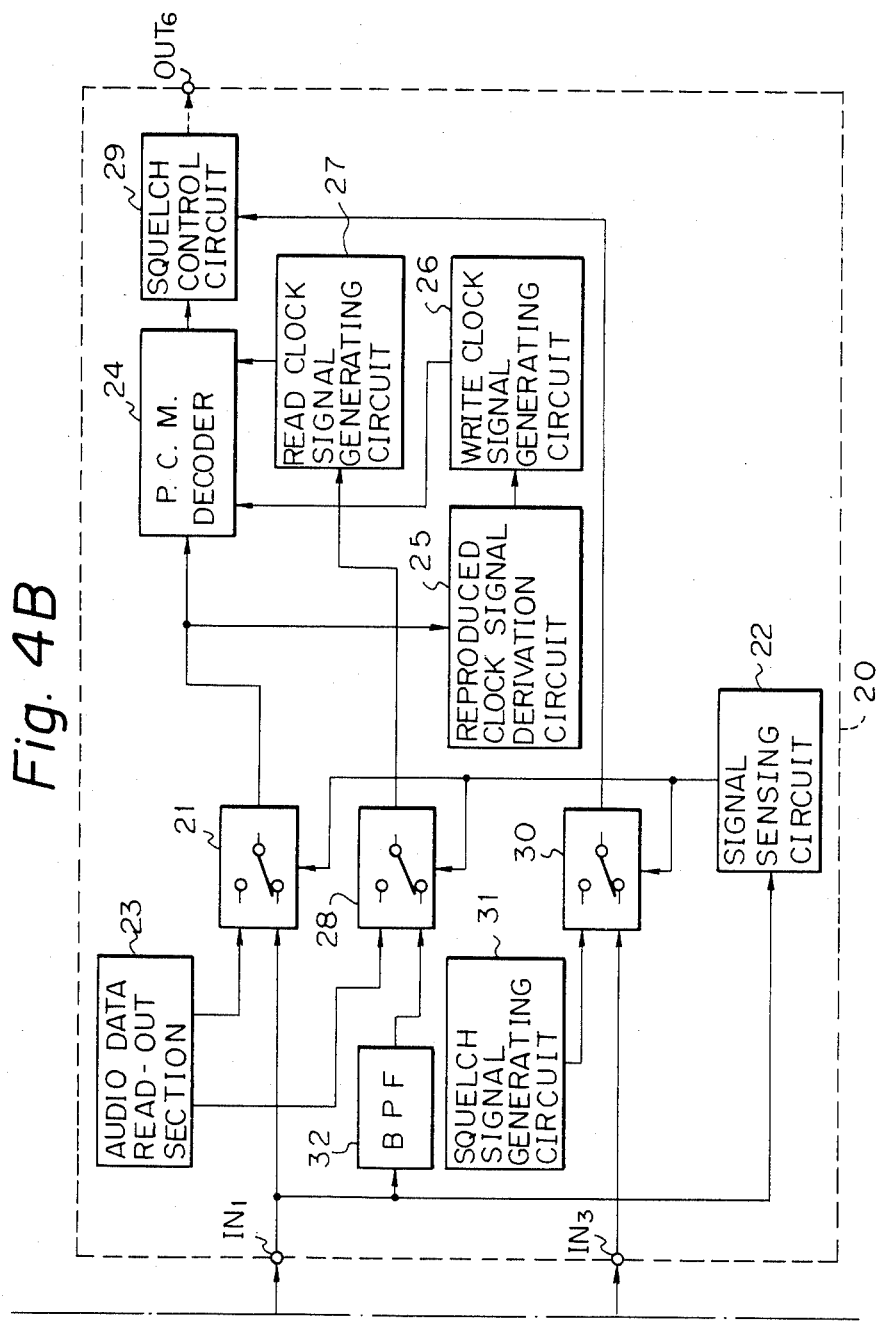

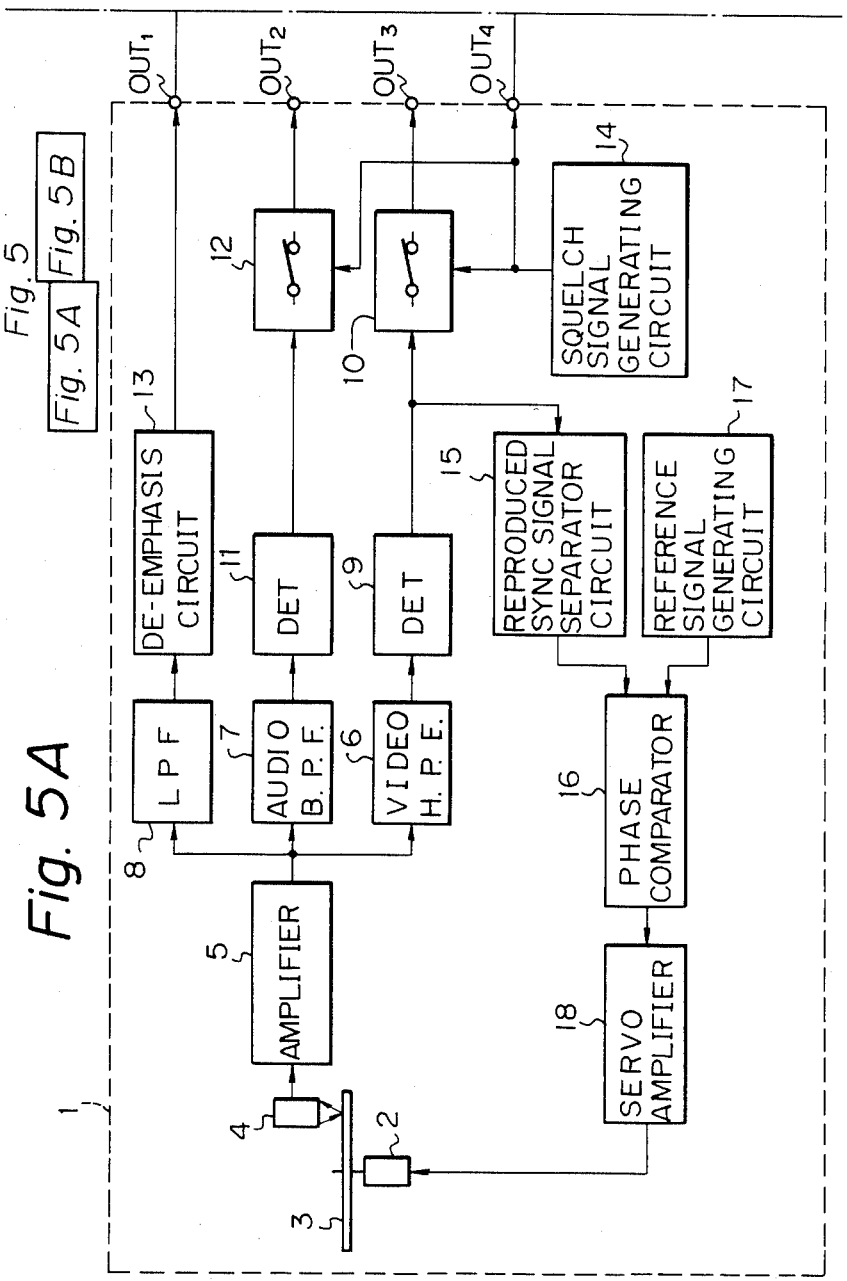

DIGITAL AUDIO DATA REPRODUCTION APPARATUS

BACKGROUND OF THE INVENTION

A new method of recording both video and audio data upon a recording medium, (e.g. formed on a recording disc whose contents are read out by an optoelectric type of pick-up) has been disclosed in Japanese application Pat. No. 58-45780 (provisional publication number 59-171011). The subject matter is also disclosed in U.S. patent application Ser. No. 527,721 filed Aug. 30, 1983. With this method, an audio signal is converted into a digital signal in PCM (pulse code modulation) form, and this PCM digital signal is superimposed upon frequency modulated audio and video components, which modulate a RF (radio frequency) carrier. The three types of data are recorded in the form of a pulse-width modulated signal, whose frequency spectrum includes the essential frequency components of the digitally modulated audio signal and the frequency modulated audio and video signals. Such a recording system has the advantage that the quality of reproduced sound which can be obtained from digital modulation is substantially higher than is obtainable with recording using frequency modulation, so that by providing a suitable PCM encoder within a video recording disc player it becomes possible to play such discs and thereby obtain the improved sound quality of digital recording.

However incorporation of a PCM encoder circuit and associated circuits (e.g. for clock signal generation etc) within a video recording disc player will substantially increase the manufacturing cost of such a player, and there is therefore a requirement for means whereby such a new type of video recording disc having audio data digitally recorded thereon can be played on a video recording disc player without the necessity of utilizing a built-in PCM encoder.

SUMMARY OF THE DISCLOSURE

It is an object of the present invention to overcome the problem described above, by providing a digital audio data playback apparatus which can be connected to receive a digitally recorded audio signal from a video recording disc player which is not equipped with a PCM encoder, and whereby the PCM encoder and associated circuits within the digital audio data playback apparatus which are normally used in reproduction of only digitally recorded audio data (e.g. from a digital audio "compact disc") is utilized also for processing the digital recorded audio signal from the video recording disc player. In this way it becomes unnecessary to provide a separate PCM encoder within the video recording disc player, so that this can be almost identical to a conventional type of video recording disc player, whereby no significant increase in manufacturing cost by comparison with a conventional type of video recording disc player is entailed in providing a capability for reproduction of digitally recorded audio data.

BRIEF DESCRIPTION OF THE DRAWINGS

FIG. 3 illustrates the manner of interconnecting FIGS. 3A and 3B;

FIGS. 3A and 3B are general block diagrams of a first embodiment of a digital audio data playback apparatus according to the present invention;

FIG. 4 illustrates the manner of interconnecting FIGS. 4A and 4B;

FIGS. 4A and 4B are general block diagrams of a second embodiment of a digital audio data playback apparatus according to the present invention; and FIG. 5 illustrates the manner of interconnecting FIGS. 5A and 5B;

FIGS. 5A and 5B are general block diagrams of a third embodiment of a digital audio data playback apparatus according to the present invention.

DESCRIPTION OF THE PREFERRED EMBODIMENTS

Figure 1:
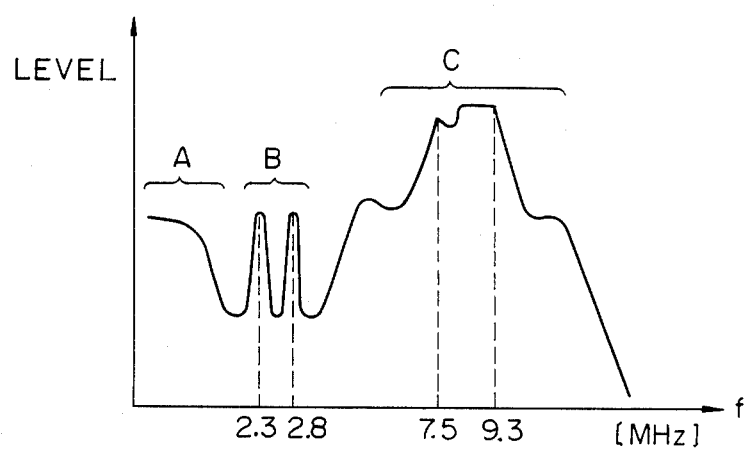
FIG. 1 is a graph illustrating the frequency spectrum of the signal which is read out from a video recording disc having digital audio data superimposed upon FM audio and video data.

As stated above, the present invention is directed toward a digital audio data playback apparatus for reproduction of a digital recorded audio signal which is recorded on a recording medium (e.g. a recording disc) in conjunction with FM (frequency modulated) audio and video data. FIG. 1 is a graph showing an example of the frequency spectrum of the RF (radio frequency) signal which is output from the pick-up of a video recording disc player when playing such a recording disc. In FIG. 1, portion A of the spectrum denotes the range of frequency components constituting the digital recorded audio signal, B denotes the range of frequency components constituting the frequency modulated audio signal, and C denotes the range of frequency components constituting the frequency modulated video signal. In this example, the audio data is recorded as two (stereo) channels, and the two peaks in the frequency modulated audio signal spectrum portion B (at 2.3 and 2.8 MHz) correspond to these two FM audio channels. As mentioned above, modulated signals representing digitally encoded audio data, FM audio data and FM video data are recorded on the recording medium by pulse-width modulation. The digitally recorded audio signal may be recorded by the EFM (eight-to-fourteen modulation) method. In this case, the maximum frequency of the digital recorded audio signal spectrum components will correspond to a period of 3T, (where T is the period of the PCM signal pulses) and the maximum frequency will correspond to 11T. Typically, 3T will represent a frequency of 720 KHz, while 11T will represent approximately 200 KHz, i.e. the corresponding portion A of the spectrum shown in FIG. 1 will extend from approximately 200 KHz to 720 KHz. The level of the digital recorded audio signal modulation component is made 1/10 or less that of the video signal carrier.

Figure 2A:
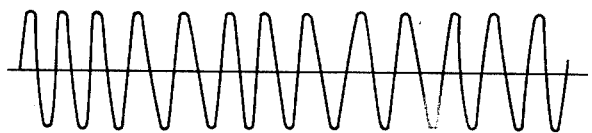
FIGS. 2(A) to (E) are waveform diagrams for assistance in describing a method of recorded digitally encoded audio data combined with FM video and audio data on a recording disc.
Figure 2B:
Figure 2C:
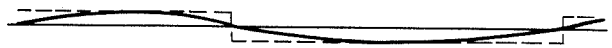
Figure 2D:
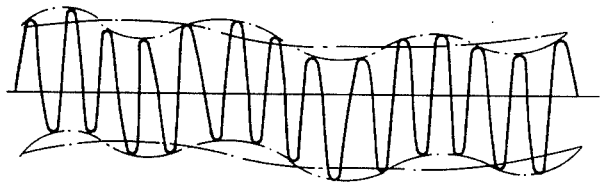
Figure 2E:

The type of modulation utilized with the method described above is illustrated in FIGS. 2(A) to 2(E). A frequency modulated RF video carrier signal shown in FIG. 2(A) has analog-varying audio signal, shown in FIG. 2(B) and a PCM encoded audio signal, shown in FIG. 2(C) superimposed upon it, to form the modulated signal shown in FIG. 2(D). This signal is then amplified and amplitude-limited, to leave only the portions of the original signal which were close to the zero-crossing points of that signal. The results of this operation is to provide a pulse-width modulated signal as shown in FIG. 2(E), comprising a train of pulses, which has the frequency spectrum shown in FIG. 1. This is the signal which is recorded, and subsequently read out, e.g. by the pick-up of a video recording disc player. Due to the practical limitations of recording technology, the digital pulse train audio signal will be modulated in the form of a gradually varying waveform as illustrated by the whole-line portion of FIG. 2(C), rather than as a square-waveform signal of the form indicated by the broken-line outline in FIG. 2(C).

It has been found that audio reproduction using such a digital recorded audio signal enables high fidelity and a very wide dynamic range (approximately 90 dB) to be attained, which is substantially greater than is attainable with audio FM recording.

Figure 3A:
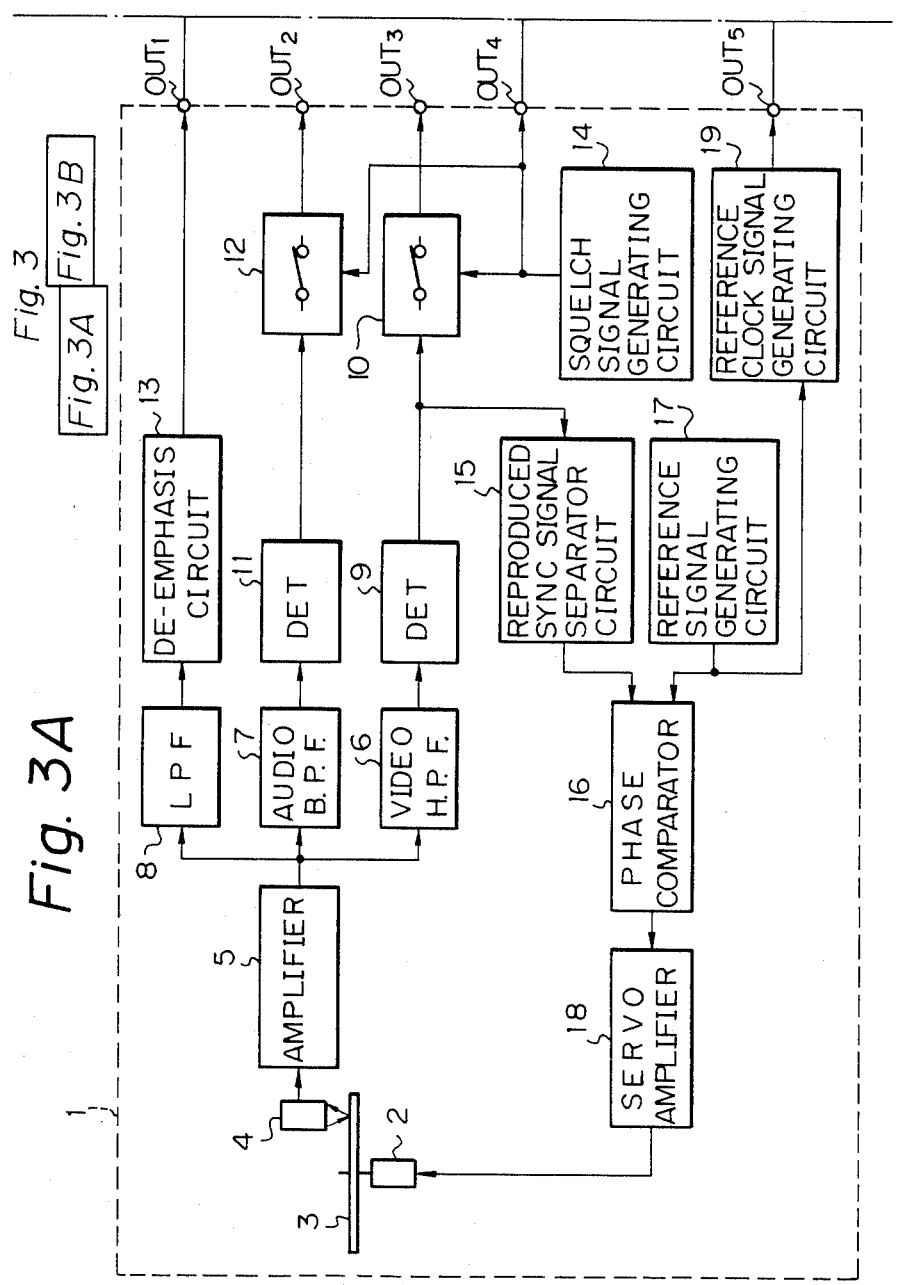

Referring now to FIG. 3A, a general block diagram is shown of an embodiment of a digital audio data playback apparatus according to the present invention, which in this case is a digital audio disc player denoted by numeral 20, and is coupled to a video recording disc player. Numeral 1 denotes this video recording disc player, in which a motor 2 rotates a video disc 3. Video disc 3 has FM audio and video and digitally encoded audio data recorded on a recording medium formed thereon, as described hereinabove. For simplicity of description, it will be assumed in the following that only a single channel of audio data is recorded, both in FM and in digitally encoded form, although of course in an actual apparatus there would be two channels recorded in each case. Signals representing the recorded data, e.g. a RF train of pulse-width modulated pulses of the form shown in FIG. 2(E), are read out by a pick-up 4, and this RF signal is then amplified by an amplifier 5. The output signal from amplifier 5 is applied to inputs of a LPF (low-pass filter) 8, an audio BPF (band-pass filter) 7, and a video HPF (high-pass filter) 6, which respectively select portions A, B and C of the frequency spectrum shown in FIG. 1 and described hereinabove. The output from LPF 8 is applied to a de-emphasis circuit 13, in which frequency components which were selectively increased in level at the stage of recording are restored to their original levels. The output signal from de-emphasis circuit 13, i.e. the reproduced PCM serial pulse train comprising a digitally encoded audio signal, is transferred to an output terminal $OUT_1$. The output signal from BPF 7 is input to a RF detector (i.e. demodulator) circuit 11, which thereby produces the audio signal which was recorded in FM form on recording disc 3. This signal is transferred through a switch circuit 12 controlled by a squelch signal (described hereinafter) to an output terminal $OUT_2$. The output signal from HPF 6 is input to a RF detector circuit 9, which thereby produces the recorded video signal. This is transferred through a switch circuit 10, also controlled by the squelch signal, to an output terminal $OUT_3$, and also is input to a reproduced sync signal separator circuit 15. The reproduced sync signal separator circuit 15 serves to separate the horizontal sync pulses from the video signal output by detector 9. Numeral 17 denotes a reference signal generating circuit 17, which produces a reference horizontal sync signal, at a fixed frequency of 15.75 KHz. This signal is applied to one input of a phase comparator circuit 16, to whose other input the horizontal sync signal from reproduced sync signal separator circuit 15 is applied, whereby phase comparator circuit 16 acts to measure the amount of phase difference between these signals and to produce an error signal representing the amount of this phase difference. This error signal is input to a servo-amplifier circuit 18, whose output signal controls the speed of rotation of drive motor 2 which rotates the video disc 3, acting such as to bring the amount of phase difference between the reference horizontal sync signal and the reproduced horizontal sync signal towards zero. In this way, a feedback loop is established which holds the relative velocity between the read-out point of pick-up 4 and the recording tracks on disc 3 to a fixed value.

The fixed-frequency output signal from reference signal generating circuit 17 is also input to a reference clock signal generating circuit 19, which produces a reference clock signal. This signal is applied to output terminal $OUT_5$.

Squelch circuit 14 generates a squelch signal in accordance with the current state of operation of the video recording disc player, which controls switch circuits 10 and 12 such that output signals are only transferred to output terminals $OUT_2$ and $OUT_3$ (and hence to a video display and an audio amplifier/speaker apparatus connected to these terminals) at appropriate times.

The digital audio disc player 20 in FIG. 3B is provided with three input terminals, $IN_1$, $IN_2$ and $IN_3$, which are respectively coupled to output terminals $OUT_1$, $OUT_5$ and $OUT_4$ of video recording disc player 1, i.e. to respectively receive the PCM encoded audio data from de-emphasis circuit 13, the reference clock signal and the squelch signal. Numeral 23 denotes the audio data read-out section of the player, i.e. comprising a pick-up for reading out digitally encoded audio data from a digital audio recording disc, rotated by a motor. For simplicity of description, the pick-up, motor, control circuit means etc of digital audio disc player 20 are omitted from the drawings. The digitally encoded audio signal from audio data read-out section 23 is output on a line 23b, while a reference clock signal is output on line 23a. Line 23b is connected to one input of a changeover switch circuit 21, while input terminal $IN_1$ is connected to the other input of changeover switch circuit 21. Line 23a from audio data read-out section 23 is connected to one of the inputs of a changeover switch circuit 28, while the other input of changeover swithc circuit 28 is coupled to input terminal $IN_2$. A squelch signal generating circuit 31 generates a squelch signal (having the same function as described hereinabove for squelch signal generating circuit 14), which is applied to one input of a changeover switch circuit 30, while input terminal $IN_3$ is connected to the other input of changeover switch circuit 30. Input terminal $IN_1$ is also connected to the input of a signal sensing circuit 22, which serves to produce a sensing signal to indicate that a digitally encoded audio signal is being input to digital audio disc player 20 from video recording disc player 1. This sensing signal is applied to control terminals of each of changeover switch circuits 21, 28 and 30. As a result, while a digitally encoded audio signal is being applied to input terminal $IN_1$, that signal is transferred to the output of changeover switch circuit 21, while the reference clock signal from input terminal $IN_2$ is transferred to the output of changeover switch circuit 28, and the squelch signal from input terminal $IN_3$ is transferred to the output of changeover switch circuit 30. Conversely, if no digitally encoded audio signal is being applied to input terminal $IN_1$, then the digitally encoded audio signal from audio data read-out section 23 is transferred to the output of changeover switch circuit 21, while the reference clock signal from audio data read-out section 23 is transferred to the output of changeover switch circuit 28, and the squelch signal from squelch signal generating circuit 31 is transferred to the output of changeover switch circuit 30. In this way, automatic changeover of operation of digital audio disc player 20 is implemented between reproduction of digitally encoded audio data from an audio recording disc whose contents are read out by audio data read-out section 23 and digitally encoded data from a video recording disc whose contents are read out by video recording disc player 1. It is of course essential that the same type of encoding of the audio data is implemented on the video recording discs which are read out by video recording disc player 1 and the audio discs which are ready out by audio data read-out section 23 in digital audio disc player 20.

The output signal from changeover switch circuit 21 is input to a PCM decoder circuit 24, which is based upon a buffer memory circuit, into which the digitally encoded audio data is stored and subsequently read out. Writing in of data to this buffer memory is performed under the control of a "write" clock signal, which is produced by write clock signal generating circuit 26 based upon a reproduced clock signal derived by reproduced clock signal derivation circuit 25 from the digitally encoded audio signal from the output of changeover switch circuit 21. The period of the reproduced clock signal thus derived is equal to that of the EFM digitally encoded audio signal. Read-out of data from the buffer memory of PCM decoder circuit 24 is carried out under the control of a "read" clock signal, whose frequency is made identical to the original data sampling frequency by which the PCM encoded audio signal was originally formed. This "read" clock signal is generated by a read clock signal generating circuit 27, based upon a reference clock signal which is input thereto from changeover switch circuit 28, i.e. the output signal from reference clock signal generating circuit 19 for the case of a digitally encoded audio signal from a video disc being played, or the reference clock signal from audio data read-out section 23, in the case of an audio disc being played. In this way, the correct relationships are established between the "write" clock signal and "read" clock signal and the digitally encoded audio signal, in each case.

The original analog audio signal corresponding to the digitally encoded audio signal input to PCM decoder circuit 24 is thereby output from the decoder, and is transferred through a squelch control circuit 29 to an output terminal $OUT_6$. The squelch control circuit 29, which selectively controls transfer of the reproduced audio signal to output terminal $OUT_6$, can comprise for example an analog switch.

It can thus be understood that with this embodiment of a digital audio data playback apparatus according to the present invention, that is to say digital audio disc player 20, means are provided whereby an externally applied digitally encoded audio signal, together with a reference clock signal, can be applied from a source of such signals (i.e. video recording disc player 1) which is not equipped with a PCM decoder circuit or associated circuits necessary for the operation of such a PCM decoder ciruit, and whereby application of such an externally applied digitally encoded audio signal results in that signal being processed within the digital audio data playback apparatus of the present invention by the PCM decoder circuit thereof, to reproduce an analog form audio signal from that digitally encoded audio signal. It is therefore unnecessary to provide such a PCM decoder circuit within the apparatus from which the latter digitally encoded audio signal originates (i.e. video recording disc player 1 in the described embodiment).

In the embodiment described above, it is necessary to provide a total of three connecting leads between the source of the externally applied digitally encoded audio signal and the digital audio data playback apparatus according to the present invention. FIGS. 4, 4A and 4B show another embodiment of the present invention, which is basically similar to that of FIGS. 3, 3A and 3B, but in which it is only necessary to utilize two connecting leads, i.e. between output terminals $OUT_1$ and $OUT_4$ of video recording disc player 1 and input terminals $IN_1$ and $IN_3$ of digital audio disc player 20. All components and circuit blocks in this embodiment which correspond to those of the embodiment of FIGS. 3A and 3B are indicated by identical reference numerals, and no further description of these will be given. In this embodiment, the reference clock signal produced by reference signal generating circuit 17 has a frequency which is substantially higher than the range of frequency components of the EFM digitally encoded audio signal. This reference clock signal is passed through a band pass filter, BPF 33, whose output is added to the output signal from de-emphasis circuit 13 in a signal adding circuit 34, whose output is applied to output terminal $OUT_1$. A band-pass filter BPF 32 is provided in digital audio disc player 20, coupled to receive the output from signal adding circuit 34, from input terminal $IN_1$, and has the same pass-band as BPF 33, and thus can extract the reference clock signal from the output of signal adding circuit 34. This reference clock signal is then utilized as described hereinabove for the embodiment of FIGS. 3A and 3B.

Figure 5B:
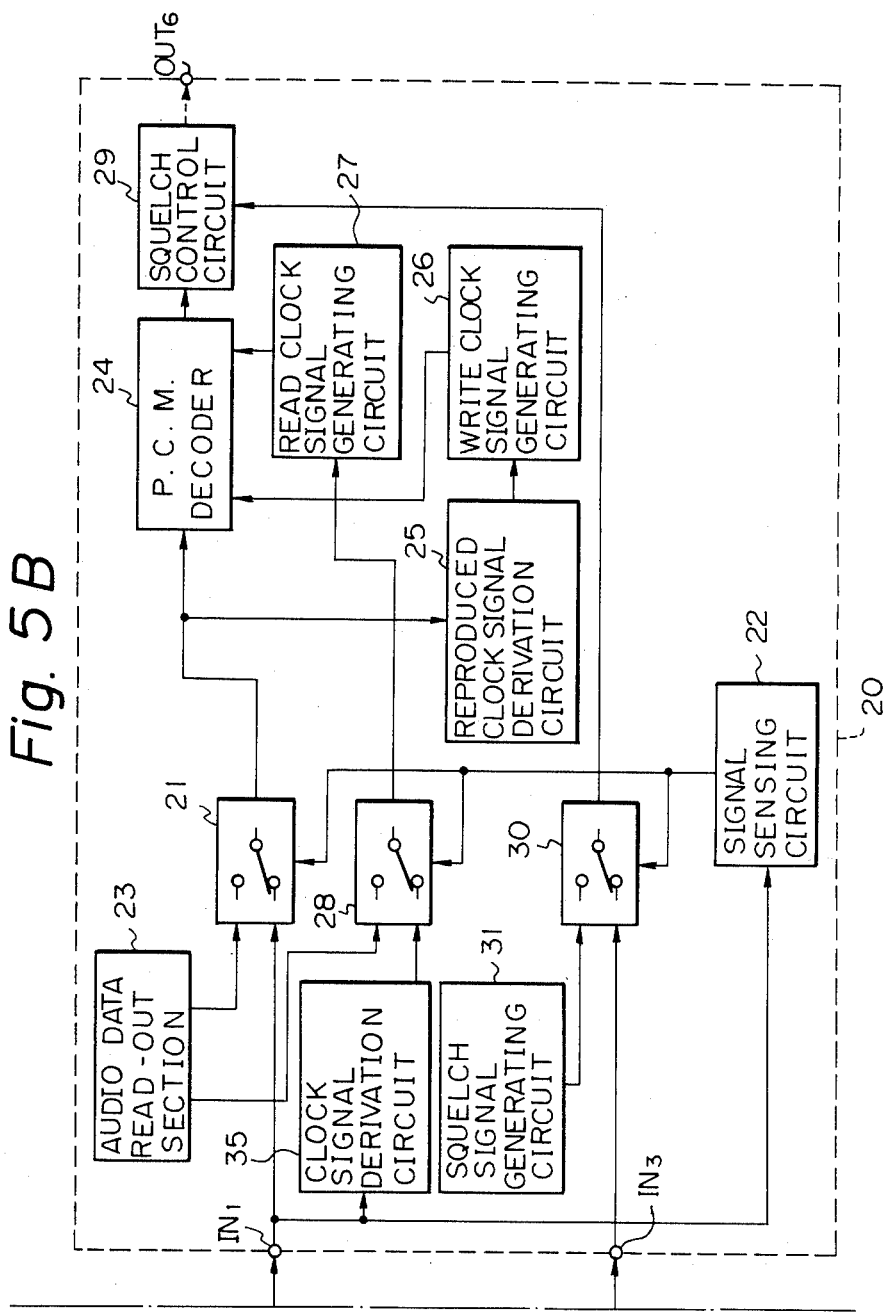

FIGS. 5, 5A and 5B show another embodiment of the present invention, in which, as in the embodiment of FIGS. 4A and 4B, it is only necessary to use two connecting leads between video recording disc player 1 and digital audio disc player 20. In this embodiment, the clock signal for operation of read clock signal generating circuit 27 is derived within digital audio disc player 20, from the input digitally encoded audio signal transferred from video recording disc player 1, by a clock signal derivation circuit 35. All components and circuit blocks in this embodiment which correspond to those of the embodiment of FIGS. 3A and 3B are indicated by identical reference numerals, and no further description of these will be given. Clock signal derivation circuit 35 can comprise a phase-lock loop circuit, which is held phase-locked with the input digitally encoded audio signal from input terminal $IN_1$, to ensure a high level of frequency stability. The clock signal thus derived is transferred through changeover switch circuit 28, to be utilized by reference clock signal generating circuit as described hereinabove. This embodiment has the advantage of enabling reference clock signal generating circuit 19 in the previous embodiments to be eliminated. However since the frequency stability of the clock signal produced by derivation circuit 35 will be affected by variations in the digitally encoded audio signal due to the effects of wow and flutter or other external disturbing factors, some problems may arise.

For simplicity of description, only single-channel audio signals have been assumed to be processed in the embodiments described above. However it will be apparent that these embodiments can be readily modified to provide two-channel audio signal processing. That is to say, BPF 7 in video recording disc player 1 can be replaced by a pair of band-pass filters, to separate two FM audio channels, with separator detectors being coupled to the outputs of these filters to derive the corresponding audio signals. Similarly, assuming that the digitally encoded audio signal produced from de-emphasis circuit 13 in video recording disc player 1 comprises two audio channels, by time-division multiplexing, then these two channels can be separated by providing a demultiplexer at the output from PCM decoder 24.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A digital audio data reproducing apparatus comprising:
   a first input terminal for receiving audio data modulated as a serial pulse train from a signal source capable of producing digital audio data;
   a second input terminal for receiving a squelch signal associated with said audio data, produced in said signal source;
   demodulation means for demodulating said serial pulse train to produce a reproduction signal when said audio data is supplied through said first input terminal;
   squelch circuit means connected to said demodulation means for squelching said reproduction signal in response to a control signal; and
   squelch control means for supplying said squelch signal through said second input terminal to said squelch circuit means as said control signal when said audio data modulated as said serial pulse train is supplied to said first input terminal.

2. A digital audio data reproducing apparatus according to claim 1, in which said apparatus further comprises:
   read out means for reading out, from a recording medium, audio data recorded on said medium as said serial pulse train;
   squelch signal generating means associated with said read out means, for generating a squelch signal in response to operational states of said read out means;
   detection means for detecting the presence of said audio data from said signal source at said first input terminal and producing a detection signal in response thereto, and wherein said demodulation means demodulates said audio data recorded on said recording medium when said detection signal is not produced by said detection means, and said squelch control means supplies said squelch signal from said squelch signal generating means to said squelch means when said audio detection signal is not produced by said detection means.

3. A digital audio data reproducing apparatus according to claim 2, in which said detection means comprises a signal sensing circuit coupled to said first input terminal of said apparatus, for detecting input of said audio data thereto and generating said detection signal in response to said audio data.

4. A digital audio data reproducing apparatus according to claim 2, in which said demodulation means comprises a pulse-code modulation signal decoder circuit.

5. A digital audio data reproducing apparatus according to claim 4, in which said apparatus further comprises clock signal derivation circuit means coupled to receive said audio data supplied to said first input terminal, for generating a clock signal for controlling the operation of said pulse-code modulation signal decoder circuit, said clock signal being generated in synchronism with said audio data supplied to said first input terminal.

6. A digital audio data reproducing apparatus according to claim 4, in which said apparatus further comprises a third input terminal for receiving a clock signal for controlling the operation of said pulse code modulation signal decoder circuit, said clock signal being applied to said third-input terminal from said signal source.

7. A digital audio data playback apparatus according to claim 2, in which said apparatus further comprises a digital audio disc player.

* * * * *